United States Patent [19]

Banno

[11] Patent Number: 4,841,494
[45] Date of Patent: * Jun. 20, 1989

[54] UNDERWATER PIEZOELECTRIC ARRANGEMENT

[75] Inventor: Hisao Banno, Tohkai, Japan

[73] Assignee: NGK Spark Plug Co., Ltd., Aichi, Japan

[*] Notice: The portion of the term of this patent subsequent to Sep. 22, 2004 has been disclaimed.

[21] Appl. No.: 212,676

[22] Filed: Jun. 28, 1988

[30] Foreign Application Priority Data

Jul. 3, 1987 [JP] Japan ................................ 62-167588
Jul. 3, 1987 [JP] Japan ................................ 62-167589

[51] Int. Cl.$^4$ ............................................. G01V 1/38
[52] U.S. Cl. ..................................... 367/157; 367/159; 367/169; 310/337; 310/800
[58] Field of Search ............... 310/322, 334, 337, 800; 367/155, 157, 159, 160, 161, 164, 165, 166, 169, 170

[56] References Cited

U.S. PATENT DOCUMENTS

| 3,593,048 | 7/1971 | Dunegan et al. | 29/419 |
| 3,798,474 | 3/1974 | Cassand et al. | 310/331 |
| 3,860,899 | 1/1975 | Watlington | 367/131 |
| 4,183,010 | 1/1980 | Miller | 367/154 |
| 4,194,198 | 3/1980 | Redfern | 340/560 |
| 4,354,132 | 10/1982 | Borburgh et al. | 310/334 |
| 4,376,302 | 3/1983 | Miller | 367/157 |
| 4,406,323 | 9/1983 | Edelman | 310/800 X |
| 4,461,179 | 7/1984 | Holt | 310/800 X |
| 4,523,471 | 6/1985 | Lee | 310/800 |
| 4,695,988 | 9/1987 | Banno | 367/154 |

FOREIGN PATENT DOCUMENTS 2556165  7/1985  France .
53-105799 2/1978  Japan .
1068392A 1/1984  U.S.S.R. .

OTHER PUBLICATIONS

IEEE 1984 Ultrasonic Symposium Proceedings.

Primary Examiner—Brian S. Steinberger
Attorney, Agent, or Firm—Larson and Taylor

[57] ABSTRACT

Underwater piezoelectric arrangement in which it comprises two piezoelectric elements made of piezoelectric ceramic-polymer composites and juxtaposed to form a single layer structure, one of the element(s) having larger hydrophone constant than that of the other element(s), and by noise cancelling of the piezoelectric assembly there can be selectively detected only charges or voltages generated by acoustic waves which acts on each element.

9 Claims, 3 Drawing Sheets

UNDERWATER PIEZOELECTRIC ARRANGEMENT

FIELD OF THE INVENTION

The present invention relates to an underwater piezoelectric arrangement for use in a submarine earthquake searching or fish finding hydrophone, or an acoustic measuring element in a liquid cleanser of a supersonic washing machine.

BACKGROUND OF THE INVENTION

It is known that a piezoelectric ceramic-polymer composite can be produced by mixing ferroelectric ceramic particles of lead zirco-titanate or lead titanate with piezoelectric organic material such as polyvinylidene fluoride, polyvinyl fluoride, polyvinylidene chloride, polyvinyl chloride or nylon, or organic material such as synthetic rubber or synthetic resin, and has acoustic impedance characteristics similar to that of water. It is also known that when such a piezoelectric ceramic-polymer composite material is used for a piezoelectric transducer, it can efficiently receive acoustic waves propagated under water to provide advantages of increasing the sensitivity.

For example, U.S. Pat. No. 4,183,010 discloses a coaxial line hydrophone comprising radially spaced conductors and intermediate dielectric filler material that has both piezoelectric and electret properties such as polyvinylidene fluoride, and method of measuring underwater soundings at either low or high hydrostatic pressures by measuring electrostatically generated signals between conductors at low hydrostatic pressures and piezoelectrically generated signals at high hydrostatic pressures.

U.S. Pat. No. 4,376,302 discloses a piezoelectric polymer hydrophone in which it comprises a single flexible sheet of a piezoelectric polymer having a plurality of electrode stripes on the top and bottom thereof, the electrode stripes at the top are staggered by one half the width of a strip relative to the corresponding strips at the bottom of the sheet and the polymer sheet can be rolled into a helix without losing its acoustic sensitivity.

With the arrangement as mentioned above, since the piezoelectric device is flexible, the piezoelectric portion of the device is subjected to not only an acoustic wave but also a pressure such as, for example, tensile stress at the blowing stream, or a bending stress due to the stream of water or wave. By these mechanical stresses may occur a distortion in the longitudinal direction of the piezoelectric portion, that is, in a direction perpendicular to the polarized axis to generate a charge or voltage which produces a noise signal to be superposed on the acoustic wave, thereby decreasing the S/N ratio.

In order to overcome the problem mentioned above, I have been proposed in U.S. Pat. No. 4,695,988 an underwater piezoelectric arrangement in which it comprises two piezoelectric layers made of piezoelectric ceramic-polymer composites, one of the layers has larger hydrophone constant than that of the other layer, and the piezoelectric layers are so arranged that the charges or voltages generated by stresses which act on these layers in their longitudial direction become substantially equal to each other, thereby producing a difference in the charges or voltages generated on the two piezoelectric layers.

With this arrangement, by cancelling the charges or voltages generated on the both piezoelectric layers by the stresses which act on these layers in their longitudial direction, a noise signal can be removed and thus the S/N ratio can be improved.

However, the previously proposed arrangement has the following disadvantages;

(1) Due to the superimposed structure of the two piezoelectric layers, it is difficult to provide uniformly at high density an adhere layer or insulating layer which should be interposed between the piezoelectric layers and then to avoid an occurrence of air bubbles or blowholes, thereby resulting in a reflection or loss of an acoustic wave, a deterioration of the characteristic and a power reduction.

(2) Since the piezoelectric layers are made of different materials, they are different in a hardness or other physical properties, and then it is difficult that they are formed to have a uniform thickness. Yield in a manufacture of the device may be deteriorated.

It is, therefore, an object of the present invention to overcome the abovementioned drawbacks and disadvantages of the conventional piezoelectric device and to provide an underwater piezoelectric arrangement having a single layer structure.

A further object of the invention is to provide an underwater piezoelectric cable which comprises said piezoelectric arrangement.

SUMMARY OF THE INVENTION

According to one aspect of the present invention, there is provided an underwater piezoelectric arrangement comprising at least one first and at least one second piezoelectric elements juxtaposed, said first piezoelectric element being made of a polarized ceramic-polymer composite having a first hydrophone constant and generating electrostatic charges of opposite polarities on the opposed surfaces thereof in response to stresses which act on said first piezoelectric element in a direction parallel to said surfaces thereof, said second piezoelectric element being made of a polarized ceramic-polymer composite having a second hydrophone constant smaller than said first hydrophone constant and generating electrostatic charges of opposite polarities on the opposed surfaces thereof in response to stresses which act on said second piezoelectric element in a direction parallel to said surfaces thereof, the levels of said charges generated on the surfaces of each of said piezoelectric elements in response to said stresses being substantially equal, electrode members provided on respective opposed surfaces of each of said first and second piezoelectric elements, said electrode member on the positive pole surface of said first piezoelectric element being electrically connected to said electrode member on the negative pole surface of said second piezoelectric element, said electrode member on the negative pole surface of said first piezoelectric element being electrically connected to said electrode member on the positive pole surface of said second piezoelectric element, and a pair of terminals connected to said electrode members on the positive pole surface of said first piezoelectric element and the negative pole surface of said second piezoelectric element and said electrode members on the negative pole surface of said first piezoelectric element and the positive pole surface of said second piezoelectric element for providing detection of an output signal produced in accordance with the difference between the hydrophone constants of said first and second piezoelectric elements only in response to acoustic waves being received by the arrangement and cancellation of noise signals produced in accordance with said charges on said first and second piezoelectric elements.

Preferably, said first piezoelectric element may be formed of a mixture of lead titanate ($PbTiO_3$) and polymer, and said second piezoelectric element may be formed of a mixture of lead zirco-titanate ($Pb(ZrTi)O_3$) and polymer.

In the preferred embodiment, said first and second piezoelectric elements may be so arranged that the polarizing direction of said first piezoelectric element is either the same as or opposite to that of said second piezoelectric element.

According to a second aspect of the present invention, there is provided an underwater piezoelectric cable comprising at least one first and at least one second piezoelectric elements juxtaposed, said first piezoelectric element being made of a polarized ceramic-polymer composite having a first hydrophone constant and generating electrostatic charges of opposite polarities on the opposed surfaces thereof in response to stresses which act on said first piezoelectric element in a direction parallel to said surfaces thereof, said second piezoelectric element being made of a polarized ceramic-polymer composite having a second hydrophone constant smaller than said first hydrophone constant and generating electrostatic charges of opposite polarities on the opposed surfaces thereof in response to stresses which act on said second piezoelectric element in a direction parallel to said surfaces thereof, the levels of said charges generated on the surfaces of each of said piezoelectric elements in response to said stresses being substantially equal, electrode members provided on respective opposed surfaces of each of said first and second piezoelectric elements, said electrode member on the positive pole surface of said first piezoelectric element being electrically connected to said electrode member on the negative pole surface of said second piezoelectric element, said electrode member on the negative pole surface of said first piezoelectric element being electrically connected to said electrode member on the positive pole surface of said second piezoelectric element, and a pair of terminals connected to said electrode members on the positive pole surface of said first piezoelectric element and the negative pole surface of said second piezoelectric element and said electrode members on the negative pole surface of said first piezoelectric element and the positive pole surface of said second piezoelectric element for providing detection of an output signal produced in accordance with the difference between the hydrophone constants of said first and second piezoelectric elements only in response to acoustic waves being received by the arrangement and cancellation of noise signals produced in accordance with said charges on said first and second piezoelectric elements.

Preferably, said first and second piezoelectric elements may be alternately disposed along a cable core.

The noise cancelling principle in the present invention will now be described.

When one piezoelectric element has a hydrophone constant $1_{dh}$ and piezoelectric constants $1_{d33}$ and $1_{d31'}$ there is the following relation among them:

$$1_{dh} = 1_{d33} + 2 \cdot 1_{d31}$$

Similarly, when the other piezoelectric element has a hydrophone constant $2_{dh}$ and piezoelectric constants $2_{d33}$ and $2_{d31'}$ there is the following relation among them:

$$2_{dh} = 2_{d33} + 2 \cdot 2_{d31}$$

In this connection, it is appreciated that the piezoelectric constants $1_{d33}$ and $2_{d33}$ represent electric conversion rates responding to the pressure of a radial direction (a direction parallel to a polarizing axis), and an electric charge based on the constants forms an acoustic wave signal. The piezoelectric constants $d_{31}$ and $2_{d31}$ represent electric conversion rates responding to the pressure of a longitudinal direction (a direction perpendicular to the polarizing axis), and an electric charge based on the constants forms a noise signal.

Further, an output charge Q is represented by following relation:

$$Q = (1_{dh} \cdot v1 - 2_{dh} \cdot v2) P$$

By using the piezoelectric constants, the output charge Q can be represented by following relation:

$$Q = [(1_{d33} \cdot v1 - 2_{d33} \cdot v2) + 2(1_{d31} \cdot v1 - 2_{d31} \cdot v2)]P$$

wherein P is a pressure of the acoustic wave signal under water, and v is a volume.

From the above relations, therefore, the following relations may be derived:

$$1_{dh} - 2_{dh} \neq 0 \quad (1)$$

$$1_{d31} \cdot v1 - 2_{d31} \cdot v2 = 0 \quad (2)$$

Thus, $(1_{d33} \cdot v1 - 2_{d33} \cdot v2)$ becomes effective, the noise signal is removed and the acoustic wave signal can be produced.

In the underwater piezoelectric arrangement according to the present invention, therefore, for the first piezoelectric element may be selectively used the polarized ceramic-polymer composite having large hydrophone constant $1_{dh}$ such as, for example, a mixture of lead titanate ($PbTiO_3$) and organic material such as rubber or resin. For example, with the mixture of lead titanate ($PbTiO_3$) and silicone rubber at 7:10, $1_{dh} = 35 \times 10^{-12}$ (C/N). For the second piezoelectric element may be selectively used the polarized ceramic-polymer composite having small hydrophone constant $2_{dh}$ such as, for example, a mixture of lead zirco-titanate ($Pb(ZrTi)O_3$) and organic material such as rubber or resin. For example, with the mixture of lead zircotitanate ($Pb(ZrTi)O_3$) and silicone rubber at 7:10, $2_{dh} = 8 \times 10^{-12}$ (C/N).

It is, therefore, appreciated that the above equation (1) can be satisfied when the hydrophone constant of one piezoelectric element is larger than that of the other piezoelectric element. Further, it is also appreciated that with these piezoelectric materials the larger the hydrophone constants $1_{dh}$ and $2_{dh}$ are, the smaller the piezoelectric constants $1_{d31}$ and $2_{d31}$ are. With $PbTiO_3$ mixed at abovementioned specific ratio, $1_{d31} = -5 \times 10^{-6}$ (C/N), and with $Pb(ZrTi)O_3$, $2_{d31} = -25 \times 10^{-6}$ (C/N).

In order to satisfy the relation of the equation (2), then, it is necessary to set the volume v1 of the piezoelectric element made of the $PbTiO_3$ composite larger than that v2 of the piezoelectric element made of the Pb(ZrTi)O$_3$ composite so that $v1/vs \mp 2_{d31}$ may be obtained, or to decrease the piezoelectric constant $2_{d31}$ by reducing the polarizing voltage so that the value of the $2_{d31}$ becomes equal to that of the $1_{d31}$ while keeping the volumes v1 and v2 at the same value.

Since the decrease in the $2_{d31}$ of the Pb(ZrTi)O$_3$ composite causes simultaneously the $2_{dh}$ thereof to reduce, the difference between the $2_{dh}$ of the Pb(ZrTi)O$_3$ composite and the $1_{dh}$ of the PbTiO$_3$ composite is further increased so that the arrangement has a good sensitivity.

The noise cancelling principle has been described based on the electric charge Q which may be generated in the piezoelectric elements, but it should be understood that this may be similarly explained based on the generated voltage V (V=Q/C).

The present invention is based upon the noise cancelling principle mentioned above, in which it is intended to equalize the electric charges or voltages generated in the first and second piezoelectric elements when the piezoelectric arrangement is subjected to mechanical stresses in the longitudinal direction or the direction parallel to the surfaces thereof, and to eliminate these charges or voltages by using an electrical subtraction. Therefore, when any acoustic wave is generated under water, only the electric charge or voltage based on the difference between the hydrophone constants of the two piezoelecteic elements can be produced.

The above and other objects, features, and advantages of the invention will be apparent upon consideration of the following detailed description taken in connection with the accompanying drawings.

DETAILED DESCRIPTION

Figure 1:
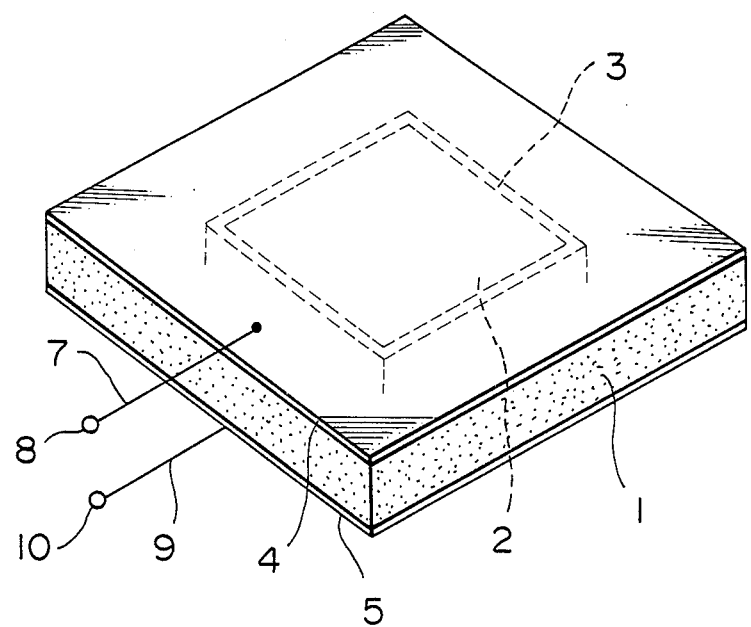
FIG. 1 is a perspective view showing a sheet-like piezoelectric arrangement according to one embodiment of the present invention.
Figure 2:
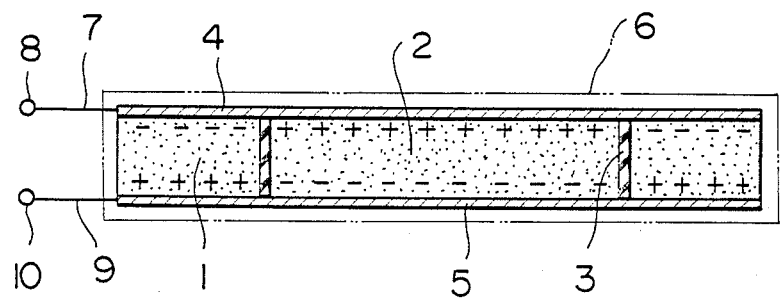
FIG. 2 is an enlarged cross sectional view of the arrangement of FIG. 1.

Reference is now made to FIGS. 1 and 2 of the drawings which schematically show a sheet-like underwater piezoelectric arrangement according to one embodiment of the present invention. The arrangement comprises a first rectangular piezoelectric element 1 which is provided with a rectangular opening at the center portion thereof, and a second rectangular piezoelectric element 2 fitted into the rectangular opening of the first element 1 with an insulating layer 3 inserted therebetween. Each of the first and second rectangular piezoelectric elements 1 and 2 is made of piezoelectric rubber, and is polarized so that the upper surface portion of the first element 1 and the lower surface portion of the second element 2 become negative and the lower surface portion of the first element 1 and the upper surface portion of the second element 2 positive as shown in FIG. 2. The insulating layer 3 may comprise an air layer, but it may be made of an insulator material such as synthetic rubber, synthetic resin or the like.

The first rectangular piezoelectric element 1 may be formed by a material such as PbTiO$_3$ having larger hydrophone constant, and second rectangular piezoelectric element 2 may be formed by a normal material such as Pb(TiZr)O$_3$. The first rectangular piezoelectric element 1 has the piezoelectric constant $1_{d31}$ and the second rectangular element 2 the piezoelectric constant $2_{d31}$ which is larger than the $1_{d31}$ at absolute value as described above. Therefore, the first piezoelectric element 1 is intended to have an area or a volume v1 larger than that v2 of the second piezoelectric element 2 so that the relation $v1/v2 = 2_{d31}/1_{d31}$ can be satisfied.

On the upper surfaces of the first and second piezoelectric elements 1 and 2 is provided an electrode plate 4 for electrically connecting these upper surfaces, and on the lower surfaces of the first and second piezoelectric elements 1 and 2 an electrode plate 5 for electrically connecting these lower surfaces. The piezoelectric assembly thus constructed should be covered with an electrically insulating coating 6 to insulate the insulating layer 3 and the electrode plates 4 and 5 as shown in FIG. 2.

The electrode plate 4 forms a negative electrode for the first piezoelectric element 1 and a positive electrode for the second piezoelectric element 2 and is connected by a conductor 7 to an output terminal 8 which is grounded. The electrode plate 5 forms a positive electrode for the first element 1 and a negative electrode for the second element 2 and is connected by a conductor 9 to an output terminal 10. An output signal is produced between the output terminals 8 and 10.

The operation of the illustrated arrangement will be described.

When the piezoelectric arrangement is subjected to stresses of a longitudinal direction which may occur due to the wavings, electric charges or voltages may be induced in the first and second piezoelectric elements 1 and 2. Since the first and second piezoelectric elements 1 and 2 are so arranged that the relation $v1/v2 = 2_{d31}/1_{d31}$ can be satisfied, the electric charge or voltage induced in the first piezoelectric element 1 is substantially the same as those induced in the second piezoelectric element 2. The negative pole of the first piezoelectric element 1 and the positive pole of the second piezoelectric element 2 are electrically shortcircuited through the electrode plate 4, and the positive pole of the first piezoelectric element 1 and the negative pole of the second piezoelectric element 2 are shortcircuited through the electrode plate 5. Therefore, the electric charges or voltages induced in the first and second piezoelectric elements 1 and 2 are cancelled to each other, and as a result, by the external stresses such as waving no potential difference or voltage difference is produced between the output terminals 8 and 10.

On the other hand, any acoustic wave acts on the entire outer surface of the arrangement and has influence on the first and second piezoelectric elements 1 and 2. In this connection, the first piezoelectric element 1 is made of the material having large hydrophone constant, and thus has higher sensitivity for the acoustic wave than that of the second piezoelectric element 2. Therefore, when the arrangement is subjected to acoustic waves generated under water, an output signal corresponding to the difference in the sensitivities of the first and second piezoelectric elements 1 and 2 is to be produced on the output terminals 8 and 10.

In this way, the potential generated by the external stresses such as waving may be cancelled, and thus only an electrical signal corresponding to the acoustic wave may be produced on the output terminals 8 and 10. Therefore, the piezoelectric arrangement may be operated to receive only the acoustic waves without influence by bending or other physical external force.

In a practical application, a number of piezoelectric arangements may be submerged at predetermined positions under water for detecting the acoustic waves, whereby any irregularity in the acoustic waves under water can be measured.

Figure 3:
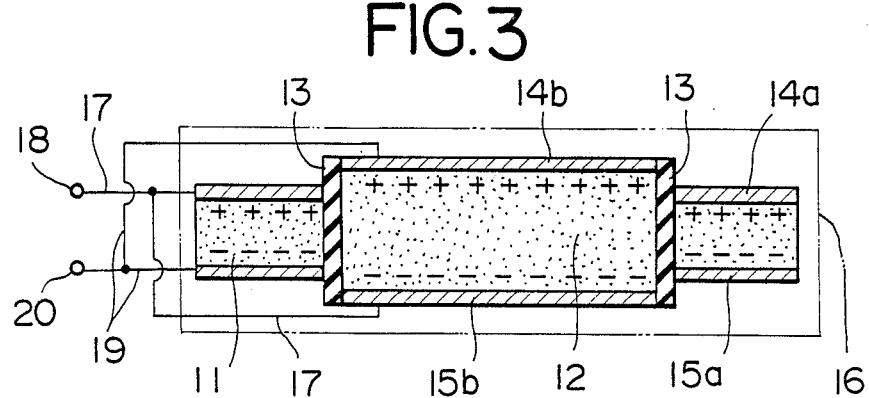
FIG. 3 is a cross sectional view showing a modification of the arrangement of FIGS. 1 and 2.

In FIG. 3 there is shown a modified embodiment in which the polarizing direction of a first piezoelectric element 11 is the same as that of a second piezoelectric element 12.

The second piezoelectric element 12 is provided with an insulating layer 13 at the peripheral portion thereof and is fitted into the rectangular opening formed at the center portion of the first piezoelectric element 11. The second piezoelectric element 12 has a thickness larger than that of the first piezoelectric element 11. On the upper surfaces of the first and second piezoelectric elements 11 and 12 are provided separate electrode plates 14a and 14b, respectively, which form positive poles for the first and second piezoelectric elements 11 and 12. Similarly, separate electrode plates 15a and 15b are provided on the lower surfaces of the first and second piezoelectric elements 11 and 12, respectively, and form negative poles for the first and second piezoelectric elements 11 and 12. The electrode plates 14a and 15a on the first element 11 are electrically insulated from the electrode plates 14b and 15b on the second element 12 by the insulating layer 13. The piezoelectric assembly thus formed may be covered with an insulating member 16 for preventing the assembly from being shortcircuited. The electrode plate 14a on the upper surface of the first element 11 is connected to the electrode plate 15b on the lower surface of the second element 12 by a conductor 17 which is connected to an output terminal 18, and the electrode place 14b on the lower surface of the first element 11 is connected to the electrode plate 15a on the upper surface of the second element 12 by a conductor 19 which is connected to an output terminal 20.

Figure 4:
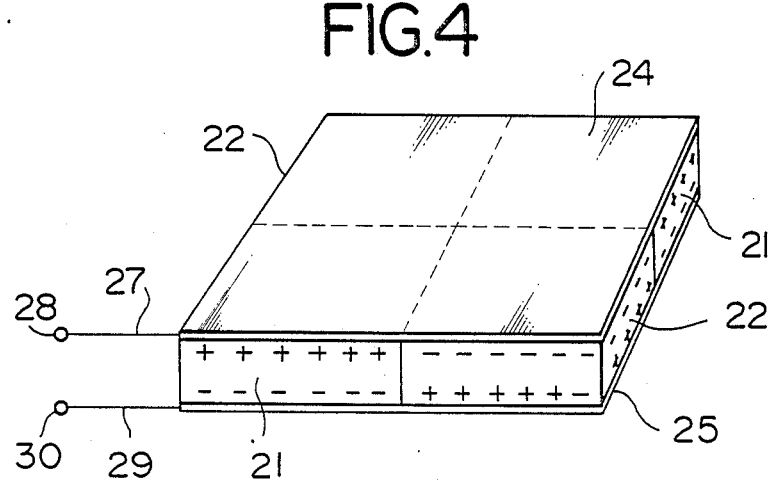
FIGS. 4 and 5 are perspective views showing different modifications of the arrangement of FIGS. 1 and 2, respectively.

FIG. 4 shows another modification in which the arrangement comprises two first piezoelectric elements 21 and two second piezoelectric elements 22 which are arranged to form a rectangular configuration. The first and second piezoelectric elements 21 and 22 are diagonally disposed, respectively. As will be seen in FIG. 4, the first and second piezoelectric elements 21 and 22 are polarized so that the polarity of the first elements 21 is reverse to that of the second elements 22. On the upper and lower surfaces of the first and second elements 21 and 22 there are provided an upper electrode plate 24 and a lower electrode plate 25, respectively. The upper electrode plate 24 is intended to shortcircuit the positive poles of the first elements 21 and the negative poles of the second elements 22, and the lower electrode plate 25 is intended to shortcircuit the negative poles of the first elements 21 and the positive poles of the second elements 22. The upper electrode plate 24 is connected through a conductor 27 to an output terminal 28, and the lower electrode plate 25 is connected through a conductor 29 to an output terminal 30.

In this embodiment, since the volume of the first elements 21 is the same as that of the second elements 22, the piezoelectric constants $1_{d31}$ and $2_{d31}$ of the first and second elements 21 and 22 are as much as possible equalized to each other by controlling the polarizing voltage in order to satisfy the relation (2).

Figure 5:
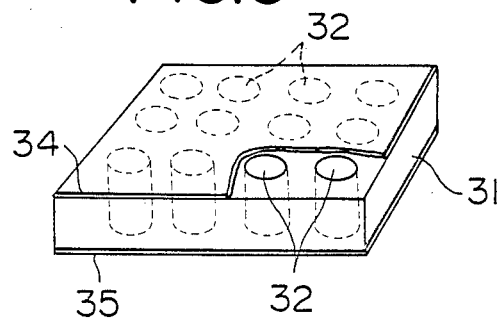

FIG. 5 shows a further modification of the sheet-like piezoelectric arrangement which comprises a first piezoelectric element 31 of a rectangular plate shape into which a plurality of second piezoelectric elements 32 of a cylindrical shape are buried. Each of the second piezoelectric elements 32 is polarized in reverse direction to the first piezoelectric element 31. On the upper surface of the assembly of the first and second piezoelectric elements 31 and 32 there is provided a electrode plate 34 for shortcircuiting the different upper poles of the first and second piezoelectric elements 31 and 32. Similarly, on the lower surface of the assembly of the first and second piezoelectric elements 31 and 32 there is provided a electrode plate 35 for shortcircuiting the different lower poles of the first and second piezoelectric elements 31 and 32.

The operation or function of each of the piezoelectric arrangements illustrated in FIGS. 3, 4 and 5 is substantially similar to that of the embodiment of FIGS. 1 and 2, and therefore the detailed description will be omitted.

It should be understood that each of the first and second piezoelectric elements illustrated in FIGS. 1 to 5 may be formed into any other shape, for example, disc shape, if necessary.

Figure 6:
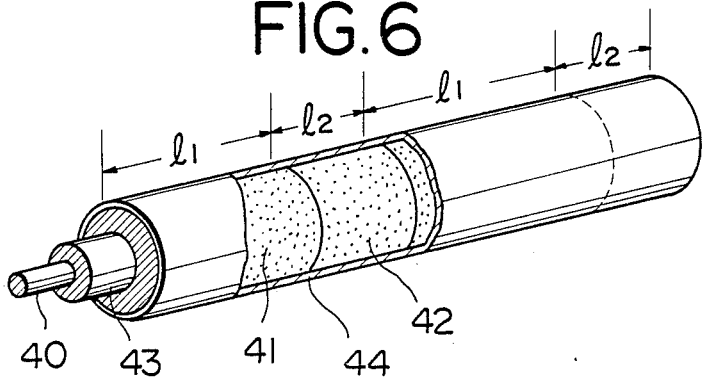
FIG. 6 is a partially fragmental perspective view showing an underwater piezoelectric cable of a cylindrical type according to another embodiment of the present invention.
Figure 7:
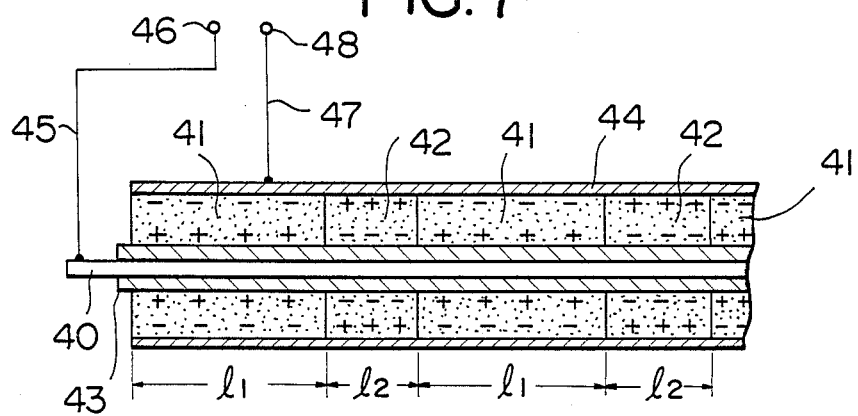
FIG. 7 is an enlarged longitudinal sectional view of the arrangement of FIG. 1.

In FIGS. 6 and 7, there is shown a piezoelectric cable according to another embodiment of the present invention. The illustrated piezoelectric cable comprises an electrode core 40, first piezoelectric elements 41 of annular shape, second piezoelectric elements 42 of annular shape, an inner conductive layer 43 and an outer conductive layer 44.

Each of the first piezoelectric elements 41 is formed of, for example, a mixture of lead titanate ($PbTiO_3$) and piezoelectric rubber having large hydrophone constant, and is polarized so that the inside portion becomes positive and outside portion negative. Each of the second elements 42 is formed of a mixture of lead zirco-titanate ($Pb(ZrTi)O_3$) and piezoelectric rubber having hydrophone constant smaller than that of the first elements 41, and is polarized so that the inside portion becomes negative and outside portion positive.

Each of the first piezoelectric elements 41 has the piezoelectric constant $1_{d31}$ which is small at absolute value compared with the $2_{d31}$ of each of the second piezoelectric elements 42. Also, the length of each of the first piezoelectric elements 41 is represented by l1, and the length of each of the second piezoelectric elements 42 is represented by l2. Therefore, in order to satisfy the condition $1_{d31} \cdot l1 = 2_{d31} \cdot l2$, the length l1 of each of the first piezoelectric elements 41 is set to be longer than that of the second piezoelectric elements 42 so that the relation $l1/l2 = 2_{d31}$ can be as much as possible satisfied.

The first and second piezoelectric elements 41 and 42 are alternately disposed on the inner conductive layer 43 provided on the outer surface of the core 40. The inner surfaces or poles of the first and second piezoelectric elements 41 and 42 are shortcircuited by the inner conductive layer 43, and the outer surfaces or poles of the first and second piezoelectric elements 41 and 42 are shortcircuited by the outer conductive layer 44.

In the piezoelectric cable thus constructed, the core 40 is connected through a conductor 45 to an output terminal 46, and the outer conductive layer 44 is connected through a conductor 47 to an output terminal 48. An output signal may be derived from the output terminals 46 and 48.

The operation or function and advantages of the illustrated piezoelectric cable are in principle similar to those of the previous embodiments, and therefore the description will be omitted.

Figure 8:
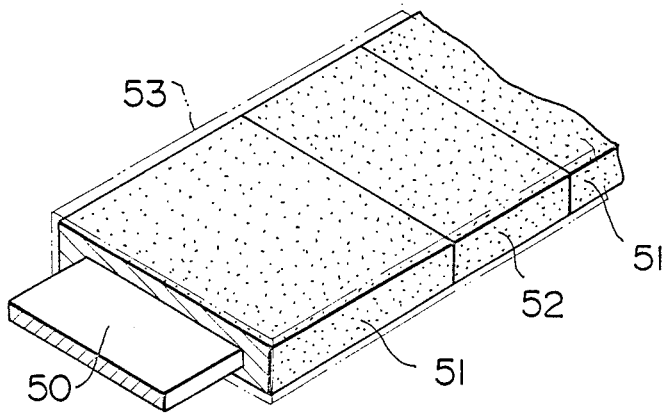
FIG. 8 is a perspective view showing an underwater piezoelectric cable of a flat type according to a further embodiment of the present invention.

FIG. 8 shows a piezoelectric flat cable according to a further embodiment of the present invention.

Reference numeral 50 denotes an electrode plate on which first and second piezoelectric elements 51 and 52 of flat type are alternately disposed. The first and second piezoelectric elements 51 and 52 are covered with an outer electrode member 53. The first and second piezoelectric elements 51 and 52 may be polarized to have the same polarizing direction as in the cable structure shown in FIGS. 6 and 7.

In the cable arrangements illustrated in FIGS. 6, 7 and 8, it should be understood that the first and second piezoelectric elements may be polarized with the same polaring direction. In that case, there may be provided means for connecting the positively polarized surface portion of each of the first piezoelectric elements and the negatively polarized surface portion of each of the second piezoelectric elements, and the negatively polarized surface portion of each of the first piezoelectric elements and the positively polarized surface portion of each of the second piezoelectric elements.

Further, in all of the embodiments illustrated and described above, the charges generated on one piezoelectric element(s) may be inverted and added to the charges generated on the other piezoelectric element(s) so as to derive the difference therebetween as an output signal.

According to the present invention as described above, by cancelling the charges on the first and second piezoelectric elements which are generated when they are subjected to any external pressure and are bent, there can be derived only the charges corresponding to the acoustic waves which are generated on the piezoelectric element(s) having larger hydrophone constant. Accordingly, the influence by the external stresses such as wavings can be certainly removed, thereby remarkably improving the S/N ratio of the output.

Further, in the piezoelectric arrangement or cable of the present invention, since the first and second piezoelectric elements are juxtaposed to form a single layer structure without any interposed layer in a longitudinal direction, no reflection of the acoustic waves may occur, and thus a stabilized performance can be obtained with a high power. Also, the piezoelectric arrangement or cable can be easily manufactured.

The terms and expressions which have been employed herein are used as terms of description and not of limitation, and there is no intention, in the use of such terms and expressions, of excluding any equivalents of the features shown and described but it is appreciated that various modification are possible within the scope of the invention claimed.

What is claimed is:

1. An underwater piezoelectric arrangement comprising at least one first and at least one second piezoelectric elements juxtaposed, said first piezoelectric element being made of a polarized ceramic-polymer composite having a first hydrophone constant and generating electrostatic charges of opposite polarities on the opposed surfaces thereof in response to stresses which act on said first piezoelectric element in a direction parallel to said surfaces thereof, said second piezoelectric element being made of a polarized ceramic-polymer composite having a second hydrophone constant smaller than said first hydrophone constant and generating electrostatic charges of opposite polarities on the opposed surfaces thereof in response to stresses which act on said second piezoelectric element in a direction parallel to said surfaces thereof, the levels of said charges generated on the surfaces of each of said piezoelectric elements in response to said stresses being substantially equal, electrode members provided on respective opposed surfaces of each of said first and second piezoelectric elements, said electrode member on the positive pole surface of said first piezoelectric element being electrically connected to said electrode member on the negative pole surface of said second piezoelectric element, said electrode member on the negative pole surface of said first piezoelectric element being electrically connected to said electrode member on the positive pole surface of said second piezoelectric element, and a pair of terminals connected to said electrode members on the positive pole surface of said first piezoelectric element and the negative pole surface of said second piezoelectric element and said electrode members on the negative pole surface of said first piezoelectric element and the positive pole surface of said second piezoelectric element for providing detection of an output signal produced in accordance with the difference between the respective hydrophone constants of said first and second piezoelectric elements only in response to acoustic waves being received by the arrangement and cancellation of noise signals produced in accordance with said charges on said first and second piezoelectric elements.

2. An underwater piezoelectric arrangement as claimed in claim 1, wherein said first piezoelectric element is formed of mixture of lead titanate ($PbTiO_3$) and polymer, and said second piezoelectric element is formed of a mixture of lead zirco-titanate ($Pb(ZrTi)O_3$) and polymer.

3. An underwater piezoelectric arrangement as claimed in claim 1, wherein said first and second piezoelectric elements are so arranged that the polarizing direction of said first piezoelectric element is the same as that of said second piezoelectric element.

4. An underwater piezoelectric arrangement as claimed in claim 1, wherein said first and second piezoelectric elements are so arranged that the polarizing direction of said first piezoelectric element is opposite to that of said second piezoelectric element.

5. An underwater piezoelectric arrangement as claimed in claim 1, wherein each of said first and second piezoelectric elements is in a sheet form.

6. An underwater piezoelectric cable comprising at least one first piezoelectric element and at least one second piezoelectric element juxtaposed, said first piezoelectric element being made of a polarized ceramic-polymer composite having a first hydrophone constant and generating electrostatic charges of opposite polarities on the opposed surfaces thereof in response to stresses which act on said first piezoelectric element in a direction parallel to said surfaces thereof, said second piezoelectric element being made of a polarized ceramic-polymer composite having a second hydrophone constant smaller than said first hydrophone constant and generating electrostatic charges of opposite polarities on the opposed surfaces thereof in response to stresses which act on said second piezoelectric element in a direction parallel to said surfaces thereof, the levels of said charges generated on the surfaces of each of said piezoelectric elements in response to said stresses being substantially equal, electrode members provided on respective opposed surfaces of each of said first and second piezoelectric elements, said electrode member on the positive pole surface of said first piezoelectric element being electrically connected to said electrode member on the negative pole surface of said second piezoelectric element, said electrode member on the negative pole surface of said first piezoelectric element being electrically connected to said electrode member on the positive pole surface of said second piezoelectric element, and a pair of terminals connected to said electrode members on the positive pole surface of said first piezoelectric element and the negative pole surface of said second piezoelectric element and said electrode members on the negative pole surface of said first piezoelectric element and the positive pole surface of said second piezoelectric element for providing detection of an output signal produced in accordance with the difference between the respective hydrophone constants of said first and second piezoelectric elements only in response to acoustic waves being received by the arrangement and cancellation of noise signals produced in accordance with said charges on said first and second piezoelectric elements.

7. An underwater piezoelectric cable as claimed in claim 6, wherein said first and second piezoelectric elements have opposite polarizing directions.

8. An underwater piezoelectric cable as claimed in claim 6, wherein said first and second piezoelectric elements have same polarizing direction.

9. An underwater piezoelectric cable as claimed in claim 6, wherein said first and second piezoelectric elements are annular and are alternately disposed around a cable core, said core comprising one of said electrode members.

* * * * *